(12) United States Patent
Amend et al.

(10) Patent No.: US 12,058,050 B2
(45) Date of Patent: Aug. 6, 2024

(54) RELIABILITY AND AGGREGATION SELECTION FOR MULTI-CONNECTIVITY NETWORK PROTOCOLS

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/771,827

(22) PCT Filed: Nov. 2, 2020

(86) PCT No.: PCT/EP2020/080669
§ 371 (c)(1),
(2) Date: Apr. 26, 2022

(87) PCT Pub. No.: WO2021/089476
PCT Pub. Date: May 14, 2021

(65) Prior Publication Data
US 2022/0400081 A1     Dec. 15, 2022

(30) Foreign Application Priority Data
Nov. 4, 2019   (EP) ..................... 19206903

(51) Int. Cl.
H04L 47/24     (2022.01)
H04L 47/20     (2022.01)
H04L 47/41     (2022.01)

(52) U.S. Cl.
CPC ............. *H04L 47/24* (2013.01); *H04L 47/20* (2013.01); *H04L 47/41* (2013.01)

(58) Field of Classification Search
CPC .......... H04L 47/24; H04L 47/20; H04L 47/41
See application file for complete search history.

(56) References Cited

U.S. PATENT DOCUMENTS

| 7,545,736 B2 * | 6/2009 | Dziong | H04L 41/0668 370/242 |
| 2010/0061721 A1 * | 3/2010 | Kotrla | H04J 14/0271 398/9 |

(Continued)

FOREIGN PATENT DOCUMENTS

| CN | 103299710 A | 9/2013 |
| CN | 106105379 A | 11/2016 |

(Continued)

OTHER PUBLICATIONS

Bonaventure Q De Coninck M Baerts F Duchene B Hesmans Uclouvain 0: "Improving Multipath TCP Backup Subflows; draft-bonaventure-mptcp-backup-00.txt", Improving Multipath TCP Backup Subflows; draft-bonaventure-mptcp-backup-00.txt, Internet Engineering Task Force, IETF; Standardworkingdraft, Internet Society (ISOC) 4, Rue Des Falaises CH-1205 Geneva, Switzerland, Jul. 6, 2015 (Jul. 6, 2015), pp. 1-11, XP015107249, [retrieved on Jul. 6, 2015] paragraphs [0002]-[0003].

(Continued)

*Primary Examiner* — Khaled M Kassim
(74) *Attorney, Agent, or Firm* — Leydig, Voit & Mayer, Ltd.

(57) ABSTRACT

A method for enabling communication between a first network entity and a second network entity via at least two network flows includes: providing at least a first network flow and a second network flow of the first network entity; measuring, by a measuring unit associated with the first network entity, condition values of each of the at least two network flows; comparing the measured condition values of the at least two network flows to entries of a condition matrix; based on comparing the measured condition values to the entries of the condition matrix, selecting a mode for the first network entity out of an aggregation mode, a reliability mode, and a single-connectivity mode; and activating the selected mode.

17 Claims, 5 Drawing Sheets

(56) References Cited

U.S. PATENT DOCUMENTS

| | | | |
|---|---|---|---|
| 2013/0163412 A1* | 6/2013 | Hughes | H04W 40/04 370/228 |
| 2013/0279331 A1* | 10/2013 | Pluntke | H04W 28/0231 370/230 |
| 2017/0245311 A1* | 8/2017 | Murray | H04W 12/033 |
| 2018/0027097 A1 | 1/2018 | Boucadair et al. | |
| 2018/0128862 A1* | 5/2018 | Satoh | G06Q 10/06 |
| 2018/0359214 A1* | 12/2018 | Janneteau | H04L 61/256 |
| 2020/0014557 A1* | 1/2020 | Wang | H04L 45/745 |
| 2020/0014623 A1* | 1/2020 | Wang | H04L 45/033 |
| 2020/0304469 A1* | 9/2020 | Reimer | H04L 41/0894 |
| 2021/0042872 A1* | 2/2021 | Simpson | G06Q 30/08 |
| 2022/0377673 A1* | 11/2022 | Amend | H04W 52/0277 |
| 2023/0012719 A1* | 1/2023 | Reimer | H04L 41/12 |

FOREIGN PATENT DOCUMENTS

| | | |
|---|---|---|
| CN | 107534605 A | 1/2018 |
| CN | 109565471 A | 4/2019 |
| WO | WO 2019162210 A1 | 8/2019 |

OTHER PUBLICATIONS

Christoph Paasch et al: "Multipath TCP", Queue: Tomorrow's Computing Today, Association for Computing Machinery, New York, NY, US, vol. 12, No. 2, Feb. 22, 2014 (Feb. 22, 2014), pp. 40-51, XP058045991, ISSN: 1542-7730, DOI: 10.1145/2578508. 2591369 p. 7.

Christoph Paasch et al: "Exploring mobile/WiFi handover with multipath TCP", Cellular Networks: Operations, Challenges, and Future Design, ACM, 2 Penn Plaza, Suite 701 New York NY 10121-0701 USA, Aug. 13, 2012 (Aug. 13, 2012), pp. 31-36, XP058008082, DOI: 10.1145/2342468.2342476 ISBN: 978-1-4503-1475-6 p. 2.

* cited by examiner

| Conditions | MC | Mobile | Wi-Fi | @Home |
|---|---|---|---|---|
| 1 | Off | 4G | On | - |
| 2 | Off | 3G/2G | On | - |
| 3 | Off | Off | On | - |
| 4 | Off | 4G | Off | - |
| 5 | Off | 3G/2G | Off | - |
| 6 | Off | Off | Off | - |
| 7 | | | | |
| 8 | On | 4G | On | - |
| 9 | On | 3G/2G | On | - |
| 10 | On | Off | On | - |
| 11 | On | 4G | Off | - |
| 12 | On | 3G/2G | Off | - |
| 13 | On | Off | Off | - |
| 14 | | | | |
| 15 | On+ @H | 4G | On | No |
| 16 | On+ @H | 3G/2G | On | No |
| 17 | On+ @H | Off | On | No |
| 18 | On+ @H | 4G | Off | - |
| 19 | On+ @H | 3G/2G | Off | - |
| 20 | On+ @H | Off | Off | - |
| 21 | | | | |
| 22 | On+ @H | 4G | On | Yes |
| 23 | On+ @H | 3G/2G | On | Yes |
| 24 | On+ @H | Off | On | Yes |

Fig. 2

| Decision | MPTCP enabled | MPTCP backup mode |
|---|---|---|
| 1 | No | No |
| 2 | No | No |
| 3 | No | No |
| 4 | No | No |
| 5 | No | No |
| 6 | No | No |
| 7 | | |
| 8 | Yes | No |
| 9 | Yes | Yes |
| 10 | Yes | No |
| 11 | Yes | No |
| 12 | Yes | No |
| 13 | Yes | No |
| 14 | | |
| 15 | Yes | No |
| 16 | Yes | Yes |
| 17 | Yes | No |
| 18 | Yes | No |
| 19 | Yes | No |
| 20 | - | No |
| 21 | | |
| 22 | No | No |
| 23 | No | No |
| 24 | No | No |

Fig. 3

| | Access Type | Costs | Reliabilty |
|---|---|---|---|
| 1 | 2G | High | ≤ 0.99 |
| 2 | 2G | High | > 0.99 |
| 3 | Wi-Fi | Low | ≤ 0.99 |
| 4 | Wi-Fi | Low | > 0.99 |

Fig. 4

| Decision | MPTCP enabled | single-connectivity mode |
|---|---|---|
| 1 | No | No |
| 2 | No | No |
| 3 | No | No |
| 4 | No | No |
| 5 | No | No |
| 6 | No | No |
| 7 | | |
| 8 | Yes | No |
| 9 | Yes | Yes |
| 10 | Yes | No |
| 11 | Yes | No |
| 12 | Yes | No |
| 13 | Yes | No |
| 14 | | |
| 15 | Yes | No |
| 16 | Yes | Yes |
| 17 | Yes | No |
| 18 | Yes | No |
| 19 | Yes | No |
| 20 | - | No |
| 21 | | |
| 22 | No | No |
| 23 | No | No |
| 24 | No | No |

Fig. 5

RELIABILITY AND AGGREGATION SELECTION FOR MULTI-CONNECTIVITY NETWORK PROTOCOLS

CROSS-REFERENCE TO PRIOR APPLICATIONS

This application is a U.S. National Phase application under 35 U.S.C. § 371 of International Application No. PCT/EP2020/080669, filed on Nov. 2, 2020, and claims benefit to European Patent Application No. EP 19206903.7, filed on Nov. 4, 2019. The International Application was published in English on May 14, 2021 as WO 2021/089476 A1 under PCT Article 21(2).

FIELD

The present disclosure relates to techniques for enabling a reliable communication connection between two network entities, in particular between a first computer unit and a second computer unit, via technically different network flows. The disclosure further relates to methods, devices and a computer product for a reliable communication connection.

BACKGROUND

Hybrid Access (HA) combines at least two different network links with the same or different network technology; for example, it combines access over a fixed network with access over a cellular network. HA can be used to share traffic load and to increase the data throughput. HA is especially suited to enhance the network performance of mobile devices like smart-phones, tablets, and smart-watches.

A typical HA client has at least two access interfaces, one for example for Digital Subscriber Line (DSL) access and another one for access to the Long Term Evolution (LTE) network. Algorithms implemented on a processor of the Hybrid Access client are focused on a distributed client-server solution with client functionality in the residential gateway and server functionality (HA Server) in a data center at the network of an operator or in the public Internet. The Multipath Transmission Control Protocol (MPTCP) according to RFC 6824: "A. Ford, C. Raiciu, M. Handley, and O. Bonaventure, "TCP Extensions for Multipath Operation with Multiple Addresses," RFC, no. 6824, January 2013" can be applied for HA. MPTCP is a standard for a transport layer protocol as an extension to the regular Transmission Control Protocol (TCP). In the MPTCP technique typically two endpoints are connected by the MPTCP technique and network performance can enhanced by using multiple interfaces to maximize the overall data throughput, enhancing reliability, and capacity aggregation across several paths. Another multipath protocol offering these benefits is Multipath QUIC according to Quentin De Coninck and Olivier Bonaventure, "Multipath Extensions for QUIC (MP-QUIC)", draft-deconinck-quic-multipath-03, August 2019".

Other known and specified multi-connectivity network architectures, requiring multipath network protocols, are Hybrid Access according to Nicolai Leymann and Cornelius Heidemann and Margaret Wasserman and Li Xue and Mingui Zhang, "Hybrid Access Network Architecture", draft-lhwxz-hybrid-access-network-architecture-02, January 2015, "BBR Specification TR-348, July 2016" or 3GPP ATSSS "3GPP Specification: 23.793, Version 16.0.0, 29 Dec. 2018".

It is commonly accepted that the use of load sharing mechanisms between a plurality of paths or network flows, e.g. HA, needs to ensure that those network flows possess a comparable level of quality of transfer, in particular so as to avoid weakening the integrity of the data that is characteristic of a given connection and that is exchanged over those various flows—the quality of transfer may be characterized by a plurality of parameters including, in particular: latency, jitter, rate of packet loss and bandwidth. In other words, the performance of multipath network protocols is directly related to the heterogeneity of used paths and accesses, when they are used simultaneously for capacity aggregation. For example, the greater the difference is between the network flows in terms of rate of packet loss, the greater the associated heterogeneity. In situations where the heterogeneity between the different network flows is not supported, massive performance degradations can be expected.

When a terminal or any other network entity benefits from hybrid access, its actual ability to make use of all of its interfaces is generally associated with the quality of each of the access networks in question, as perceived by the network entity. This quality may be expressed in terms of available bandwidth, of time to access the desired content, or indeed in terms of variation in the delay for transmitting two consecutive packets. This quality naturally varies from one network flow to another and may present differences in terms of technical heterogeneity that can be so great as to compromise setting up a multipath communication over the various network flows; the risk of a loss of integrity of the streams exchanged during the communication increases with any increase in such differences to such an extent that the communication might become unintelligible.

US 2018/0027097 A1 teaches that it is beneficial to exclude certain network flows in a HA scenario if the heterogeneity between those network flows is too large.

On the other hand, multi-connectivity has its drawbacks considering costs that are caused by transferring data between the network entities. Normally two technically different network flows cause different costs. Hence, it would be desirable to switch off the network flow, which is more costly, if it is not needed.

SUMMARY

In an exemplary embodiment, the present invention provides a method for enabling communication between a first network entity and a second network entity via at least two network flows. The first network entity has multi-connectivity functionality. The method includes: providing at least a first network flow and a second network flow of the first network entity; measuring, by a measuring unit associated with the first network entity, condition values of each of the at least two network flows; comparing the measured condition values of the at least two network flows to entries of a condition matrix, wherein the condition matrix is stored in a memory of the first network entity; based on comparing the measured condition values to the entries of the condition matrix, selecting a mode for the first network entity out of an aggregation mode, a reliability mode, and a single-connectivity mode, wherein data is transmitted via the at least two network flows simultaneously in the aggregation mode, wherein data is transmitted only via one single network flow in the reliability mode, and wherein the multi-connectivity functionality is switched off in the single-connectivity mode; and activating the selected mode.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 2 shows an exemplary condition matrix according to the invention.

FIG. 3 shows an exemplary decision lookup table according to the invention.

FIG. 4 shows an extension of the condition matrix of FIG. 2 that includes cost and reliability values.

FIG. 5 shows another exemplary decision lookup table according to the invention.

DETAILED DESCRIPTION

Figure 1:
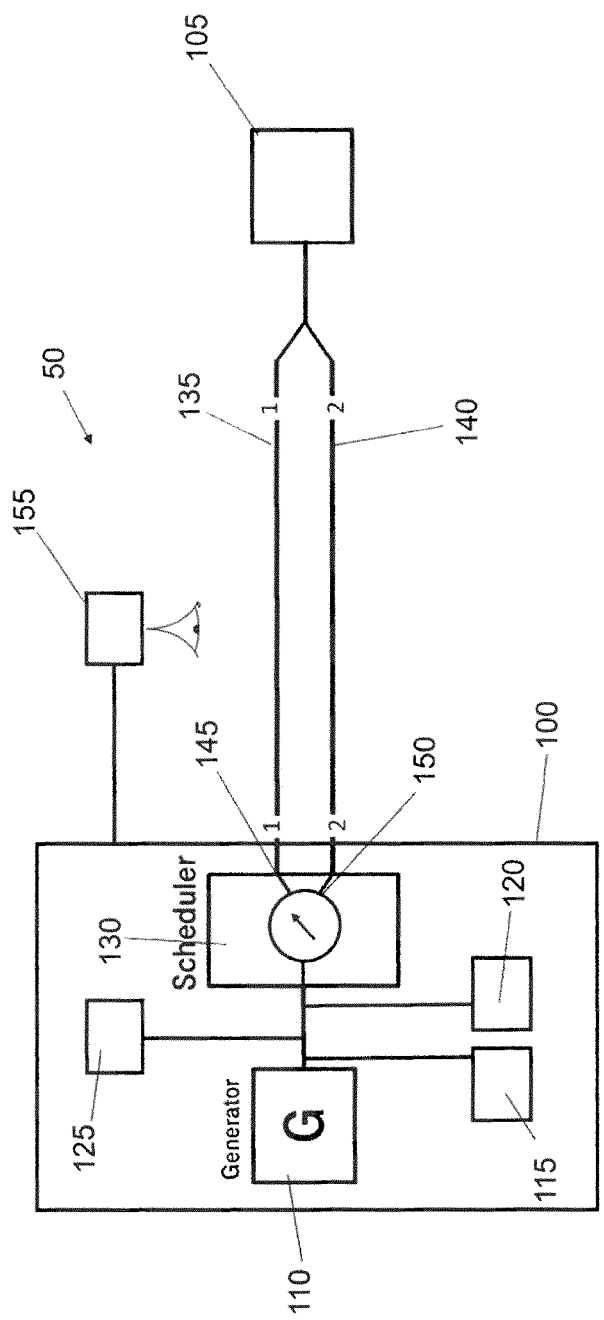
FIG. 1 shows a multipath communication system with a network entity according to the invention.

Exemplary embodiments of the invention provide methods and/or devices for providing an efficient communication connection between network entities in a hybrid access scenario.

According to a first aspect, the invention relates to a method for enabling a communication between a first network entity, which has a multi-connectivity functionality, and a second network entity via at least two different network flows, the method comprising the following steps:
  providing at least a first network flow and a second network flow of the first network entity, wherein the first network flow and the second network flow are technically different;
  measuring condition values of each of the different network flows by a measuring unit associated to the first network entity;
  comparing the measured condition values of the different network flows to entries of a condition matrix, the condition matrix being stored in a memory of the first network entity;
  activating an aggregation mode of the first network entity, wherein data is being transmitted via at least two different network flows simultaneously in the aggregation mode or activating a reliability mode of the first network entity, wherein data is being transmitted only via one single network flow in the reliability mode or a single-connectivity mode, wherein the multi-connectivity functionality is switched off in the single-connectivity mode, and wherein a selection of the appropriate mode is based on the comparison of the measured condition values of the different network flows to the entries of a condition matrix.

This provides the advantage that the method comprises three different modes, namely the aggregation mode, the reliability mode and the single-connectivity mode. The method chooses/activates that mode out of the three different modes that offers the best tradeoff between network performance and lowering the costs for the network services of the mobile device. The mode with the best network performance is the aggregation mode with full multi-connectivity functionality switched on and the mode with the lowest costs is the single-connectivity mode with full multi-connectivity functionality switched off.

The condition matrix lists possible communication environments parameters between the network entities. Basically, those communication environments can be pictured by every parameter that describes technical aspects of the communication between the network entities. The measured condition values need to be at least a subset of the entries of the condition matrix. For instance, the condition matrix is made of multiple lines, wherein each column specifies a certain combination of condition values. The comparison process then looks which line of the condition matrix matches to the measured condition values. If a match is found, it is possible to make a decision and to activate the aggregation mode or the reliability mode.

The invention can be applied on both sides of the multipath communication, which means it can be applied to both network entities. However, this might require transferring the respective measurement condition values or the condition matrix from one network entity to the other. This is especially the case if the information is not locally available.

This also provides the advantage that the heterogeneity of the different network flows can be assessed by the measured condition values. For certain combinations of the measured condition values of the different network flows, it is assumed that the heterogeneity is within an acceptable level as to enable aggregation mode of the first network entity. In this case the at least two different network flows are used simultaneously to transmit data between the first and the second network entity without having the risk that the communication might become unintelligible due to heterogeneity.

In case that the comparison of the measured condition values to the entries of the condition matrix yields that the heterogeneity between the network first and the second network flow is above an acceptable level, the reliability mode of the first network is activated. The reliability mode is different from a simple switch off of one of the network flows because even if only a single network flow is used to actually transmit the data between the network entities, the other network flow is kept activated in the background so that it can be used as a redundant network flow if the primary choice of network flow fails for some technical reasons.

If one of the network flows would be deactivated, this might cause problems in setting up a new MPTCP communication, because the first network entity might use the communication interface associated to the faulty network flow to try to set up a first communication handshake. To determine the level of heterogeneity, measured condition values can be used that indicate: latency, jitter, bandwidth, latency difference, and rate of packet loss.

A very efficiently measured value that can be used to determine the level of heterogeneity between the network flows is the access information of the respective network flow. This access information can comprise access technologies (e.g. Wi-Fi and cellular) and is simply derived by the access technology itself.

Furthermore, this method provides a methodology to decide whether to activate the path aggregation functionality or to fall back to reliability mode only. This guarantees at least a stable connectivity as long as at least one connectivity is given and adds capacity aggregation if at least the access technologies promises a beneficial interconnect.

On the other hand, the invention provides the advantage that a single-connectivity mode can be activated if the measured condition values indicates a situation in which the single-connectivity mode is sufficiently reliable in order to enable the communication between the network entities. It is possible to assign different reliability values to the different network flows. If the measured condition values show that the network entity transfers its data via a first network flow that is over a predefined reliability threshold and via a second network flow that is below this predefined reliability threshold, then it is possible to switch off the multi-connectivity functionality and to choose the first network flow for data transfer in the single-connectivity mode. The reliability values of the different network flows can be measured as measured condition values and can be entries in the condition matrix or can be stored in a different list.

In an embodiment, the method comprises switching from the aggregation mode to the reliability mode or vice versa based on a new set of measured condition values. This provides the advantage that the communication between the network entities is adapted dynamically if the conditions change. For example, if the cellular network flow shows a very low bandwidth compared to a local Wi-Fi hotspot, then it might be beneficial to switch from the aggregation mode to the reliability mode. On the other hand, if the user enters a new mobile cell with his network entity, the cellular network flow might increase its bandwidth until the heterogeneity is within an acceptable level. In that case, the method switches again from the reliability mode to the aggregation mode. Another example is if the cellular network and the Wi-Fi have differences with respect to latency. This can lead to the situation that even if a data packet in the cellular network flow is sent before a data packet in the Wi-Fi network flow, those packages can arrive at their destination in a reverse order. Those situations lead to packet scrambling that results in a bad communication performance. In that case, the method switches from the aggregation mode to the reliability mode, too.

In an embodiment, the method comprises switching between the aggregation mode, the reliability mode and the single-connectivity mode based on a new set of measured condition values. The rationale of switching between the aggregation mode and the reliability mode has already been described above. The rationale of switching from the aggregation mode to the single-connectivity mode and vice versa or switching from the reliability mode to the single-connectivity mode and vice versa can be that the new set of measured values yield different reliability values of the network flows that are used by the network entity. For example, if the user moves with his network entity from one mobile radio cell in which he has access to a 2G network to another mobile radio cell in which he has access to 5G network, it is likely that the reliability value of the cellular network increases due to the modern 5G technology. The evaluation of the new reliability values can trigger the switching to the single-connectivity mode.

In an embodiment, the condition values are measured at regular time intervals and/or at trigger events. By specifying the time intervals, network providers can determine the response time of the method from switching from the aggregation mode to the reliability mode and vice versa. The time intervals are designed as a compromise between a system with a fast response time and a system that is not being overloaded with too many measurements. A possible time interval for doing the regular measurements is 1 minute, another preferred time interval for doing the regular measurements is 1 second. A possible trigger event is if the network entity connects or reconnects to a particular access type and/or network flow. Such a situation happens if the user moves and his network entity connects from a first WLAN to a second WLAN. Because both of these WLANs can have different network performances and properties, it makes sense to measure the condition values again.

In an embodiment, the selection of the aggregation mode or the reliability mode is based on a decision look-up table, which takes the condition matrix into account. As previously explained, each line of the condition matrix represents a specific combination of possible parameters that character-ize the communication between the first and the second network entity. Therefore, the choice of which mode shall be selected can differ with each line of the condition matrix. The decision look-up table specifies the selection of the appropriate mode for each of these lines of the condition matrix.

The decision look-up table can be created with an algorithm that calculates a level of heterogeneity on the basis of the measured condition values and compares this level of heterogeneity with a predefined threshold for the level of heterogeneity. If the level of heterogeneity is exceeded, the decision look-up table sets the reliability mode. To enable this calculation, the algorithm can be implemented with properties, in particular failure probabilities, of the different network flows and other parameters concerning the communication environment. Hence, it is possible to estimate if a measured value of heterogeneity is critical in terms of successful communication. Therefore, the decision look-up table has as many lines as the condition matrix.

In an embodiment, the decision look-up table is dynamically updated based on feedback relating to successful communication between the network entities. If e.g. new technologies get into the technical field, the decision look-up table is updated because the level of heterogeneity between the first and the second network flow might change. In particular, default decision look-up tables can be stored in the network entities at delivery, but those decision look-up tables can adapt dynamically in each of those network entities taking their special technical circumstances into account.

In an implementation form, the condition matrix comprises entries of an access technology of the first network entity and/or of a cost information about the different network flows. The access technology is differentiated for mobile interfaces, cellular interfaces, fixed interfaces and Wi-Fi interfaces, which might be the case in smartphones, CPEs (Customer Premises Equipment) or other devices. The mobile access technology can be further differentiated by the following cellular mobile communication standards: 2G, 3G, 4G, 5G and can be further extended. The Wi-Fi access technology can be further differentiated by the following Wi-Fi standards: Wi-Fi 1, 2, 3, 4, 5, 6 and can be further extended. The fixed access can be further separated by copper and FTTH technology and the individual speeds negotiated. Each of the different mobile and Wi-Fi interfaces and the associated network flows can be described by individual heterogeneity values. The cost information specifies how costly the respective network flows are. This specification can be given in numbers or simply in words. For example, a possibility for such a cost information in terms of numbers can be to assign: WLAN=1 and LTE=10, wherein the path is more costly for higher numbers. Another possibility for this cost information in terms of words can be to assign: WLAN=low (costs) and LTE=high (costs).

This provides the advantage that those individual technical heterogeneity values can be implemented in the algorithm when calculating the decision look-up table. For example, if a 2G mobile network flow compared to a Wi-Fi network flow shows a heterogeneity level which is over the threshold level of heterogeneity, then the reliability mode is activated. The cost information provides the advantage that the individual costs can be considered by the algorithm when calculating the decision lookup table.

In an embodiment, the condition matrix comprises entries of an access state of the access technology. This provides the advantage that the actual condition of the different network flows can be taken into account. It might be the case that the 4G mobile network flow is offline. In this case, the activation of the reliability mode is not possible, of course. The most simple case is to differentiate if the respective network flow is switched On or Off. In addition, the signal strength, for example layer 1/2 base connection estimation, RSSI (Received Signal Strength Indicator), RSRP (Reference Signal Received Power), RSRQ (Reference Signal Received Quality) or SINR (signal to interference plus noise ratio), can be taken into account as these parameters can influence the heterogeneity between two different network flows. All those different conditions can be measured as the measuring condition values.

In an embodiment, the condition matrix comprises entries of a special communication environment of the first network entity, which can influence the heterogeneity between two different network flows. The special communication environment comprises:

Basic service sets (BSSs): An infrastructure mode wireless network basic service set (BSS) includes one redistribution point—typically an access point (WAP or AP) —together with one or more "client" stations that are associated with (i.e. connected to) that redistribution point. The operating parameters of the infrastructure-BSS are defined by the redistribution point. Stations communicate only with the redistribution point that they are associated with, and all traffic within the infrastructure-BSS is routed through/bridged by that redistribution point.
  Service set ID (SSID): The SSID is broadcast by stations in beacon packets to announce the presence of a network.
  Extended service sets (ESSs): An extended service set (ESS) is a set of one or more infrastructure basic service sets on a common logical network segment (i.e. same IP subnet and VLAN). The participating basic service sets appear as a single network to the logical link control layer. Thus, from the perspective of the logical link control layer, stations within an ESS may communicate with one another, and mobile stations may move transparently from one participating BSS to another (within the same ESS). Extended service sets make possible distribution services such as centralized authentication and seamless roaming between infrastructure-BSSs. From the perspective of the link layer, all stations within an ESS are all on the same link, and transfer from one BSS to another is transparent to logical link control.
  Location environment: The location environment can be assessed by using GPS data of the network entity, in particular of the smartphone.
  @Home environment: This environment characterizes communication parameters at the user's home.
  Authentication information.

All those different conditions can be measured as the measuring condition values. These different conditions can also be used to update the condition matrix.

This provides the advantage that further information is accessible, which can influence the generation and the validity of the decision look-up table. For example, the information that the coverage of mobile network "flows" in certain regions is better or worse than any other regions can be taken into account. This might yield in a different rate of package lost, that for its part affects the heterogeneity.

In an embodiment, one of the network flows is selected as the primary transmission flow in the reliability mode. This provides the advantage that the network flow which meets the demands of a customer or of an application running on the first network entity best can be selected as the primary data transmission flow. The primary transmission flow is used for transmitting the data stream, while the non-selected network flow is used as a backup in case of failure of the primary transmission flow.

In an embodiment, the selection of the primary transmission flow is based on the comparison of the measured condition values of different network flows to the entries of the condition matrix. All the measured condition values that have been discussed above can be used for this purpose like the traffic stream, the access technology, the access state, a simple on/off condition, the signal strength, for example layer 1/2 base connection estimation, RSSI (Received Signal Strength Indicator), RSRP (Reference Signal Received Power), RSRQ (Reference Signal Received Quality) or SINR (signal to interference plus noise ratio) and/or the special environments described above. For example, if the first network entity requests a certain bandwidth when running an application, it can be determined by the measured condition values which of the different network flows can meet this requirement. For example, if only the Wi-Fi network flow meets that requirement, it is clear that the Wi-Fi network flow is selected as being the primary transmission flow in the reliability mode.

The selection of the primary transmission flow can be influenced by many other parameters or policies of the network provider.

All multipath protocols for capacity aggregation mentioned above share the feature that additional capacity is provided for services by using more than one network flow. In case of ATSSS (3GPP Specification: 23.793, Version 16.0.0, 29 Dec. 2018), the cellular access complements the Wi-Fi access in a User Equipment (UE), e.g. a smartphone. This can lead to situations where the cellular access is engaged disproportionately, even if priority is given to the Wi-Fi access. This is an unwanted side effect of multi-path capacity aggregation, in particular if the Wi-Fi access is usually able to guarantee the Quality of Service (QoS). The phenomena is due to the higher capacity available, combined with services trying to use any available capacity in order to transfer data as fast as possible. In case one path of the multi-connectivity system is more costly than another path, this gets problematic, especially when no gain is achieved from a customer's perspective.

Those considerations can affect the selection of the primary transmission flow. In situations where at least two different network flows fulfill the demands of first network entity and/or of the user, it is beneficial to choose the network flow which is best in terms of cost efficiency. The term cost may refer to a direct payment or to other terms like latency, reliability and others.

Hence, in an embodiment, the selection of the primary transmission flow is based on a cost policy. This provides the advantage that the network flow is chosen which fulfills the QoS and causes the lowest costs for the customer and/or the network provider.

In an embodiment, the aggregation mode is switched to the reliability mode or the reliability mode is switched to the single-connectivity mode based on a cost policy that takes the different costs of the respective network flows into account. This provides the advantage that only the chosen primary transmission flow actually transmits the data and causes the costs but that the more expensive network flow is still available as a backup in case of failure of the cheaper network flow. The difference between the reliability mode and the single-connectivity mode is that the more costly network path can be activated in the reliability mode in some situations (e.g. if the primary transmission flow disrupts), whereby in the single connectivity mode the multi-functionality is truly switched off and only a single network flow can be used.

Hence, it is possible to deactivate multi-connectivity mode in case of scenarios in which multi-connectivity will not outperform single-path connectivity and reliability mode is not needed because even the single-connectivity mode is being considered as being reliable. Activation of the multi-connectivity mode does not make sense in that case in terms of costs and might be turned off. From a multi-connectivity operator perspective, this can be easily figured out for its own provided access, like Wi-Fi hotspots or residential access, and also for access where the assumption can be made on the measured condition values described above.

In the following, two exemplary decision criterion are given in terms of costs for selecting the primary transmission flow or even disabling multi-connectivity (when reliability mode is not needed):

A network operator provides cellular and residential fixed access to a customer base. For the mobile customer, the operator provides multi-connectivity for smartphones, e.g., based on ATSSS. Local Wi-Fi is chosen as the primary transmission flow in the reliability mode or multi-connectivity is disabled whenever the multi-connectivity smartphone is at home, e.g. connected to the local Wi-Fi.

A network operator provides cellular and Wi-Fi hotspots to a customer base. For the mobile customer the operator provides multi-connectivity for smartphones, e.g., based on ATSSS. A Wi-Fi hotspot is chosen as the primary transmission flow in the reliability mode or multi-connectivity is disabled whenever the multi-connectivity smartphone is connected to the operator provided Wi-Fi hotspot.

According to a second aspect, the invention relates to a first network entity that is configured for enabling a reliable multi-connectivity communication to a second network entity via at least two different network flows according to the method described above, wherein the first network entity comprises:

At least two different communication interfaces, wherein each of the communication interfaces is assigned to a specific communication interface to a specific network flow;

a memory unit configured to store a condition matrix and measurement condition values, wherein the condition matrix lists possible communication environments of the network entities and the measurement condition values lists actual measured condition values of the communication environments of the network entities;

a processor configured to compare the measurement condition values to the entries of the condition matrix, wherein the processor is configured to activate an aggregation mode of the first network entity, wherein data is being transmitted via at least two different network flows simultaneously in the aggregation mode or activating a reliability mode of the first network entity, wherein data is being transmitted only via one network flow in the reliability mode or activating a single-connectivity mode, wherein the multi-connectivity functionality is switched off in the single-connectivity mode, and wherein the selection of the appropriate mode is, based on the comparison of the measured condition values of the different network flows to the entries of a condition matrix.

Such a first network entity provides the advantage that it is possible to keep at least the reliability functionality of a multipath network protocol in place when capacity aggregation is disadvantageous due to heterogeneity between the different network flows. On the other hand, the invention provides the advantage that a single-connectivity mode can be activated if the measured condition values indicates a situation in which the single-connectivity mode is sufficiently reliable in order to enable the communication between the network entities.

In an embodiment, the first network entity comprises a measuring unit that is configured to measure the conditions of the different network flows. This provides the advantage that the network entity, for instance a smart phone, can measure the measurement conditions value independently on its own. In the following, this is called an internal measurement. This can cover technical measurements that depend on the state of the network entity that cannot be measured by external measurement units.

In an embodiment, the communication interfaces of the network entity are configured to receive the measured condition values which are measured by a remote measuring unit associated to the first network entity. This provides the advantage that the network entity has access to measurement condition values which would be otherwise not accessible. In the following, this is called an external measurement.

In an embodiment, the external and the internal measurement are combined to obtain the maximum number of measurement condition values.

According to a third aspect, the invention relates to a computer product comprising instructions which, when the program is executed by a computer, cause the computer to carry out the steps of the method described above.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a multipath communication system 50 with a first network entity 100. The first network entity 100 comprises a generator 110 that is configured to generate the data traffic, a processor 115 configured to perform calculations and to execute algorithms, and a memory unit 120 to which the processor 115 has access and which is configured to store the condition matrix of FIG. 2 and the decision look-up table of FIG. 3. The first network entity 100 further comprises an internal measuring unit 125 and a scheduler 130 that is configured to schedule the generated data stream of two different network flows 135, 140 by using communication interfaces 145, 150. Within the meaning of FIG. 1, there is a mobile network flow 135, which is associated to a mobile communication interface 145 and a Wi-Fi network flow 140, which is associated to the Wi-Fi communication interface 150.

A remote measuring unit 155 is associated to the first network entity 100 and delivers measured condition values that can be stored in the memory unit 120 along with the measuring condition values that are measured by the internal measuring unit 125. The internal measuring unit 125 has access to properties of the first network entity 100 like if multi-connectivity is turned On or Off or if one of the internal communication interfaces 145 or 150 of the first network entity 100 is malfunctioning. On the other hand, the remote measuring unit 155 has access to properties of the global communication network. It can obtain information about signal strength, the overall condition of the network and/or if some base stations are malfunctioning. Of course, many more properties of the first network entity 100 and the communication system can be measured.

In FIG. 1 the first network entity 100 builds up a multi-connectivity connection to a second network entity 105 by using the mobile network flow 135, and the Wi-Fi network flow 140. It is known that the performance of the multipath network protocol is directly related to the heterogeneity in technical parameters between the mobile network flow 135 and the Wi-Fi network flow 140 if such heterogeneities are not supported by the network entities 100, 105. In situations where the heterogeneity, like bandwidth or latency difference, is too large, massive performance degradations are expected. In such situations the first network entity 100 shall switch from an aggregation mode, which uses both the mobile network flow 135 and the Wi-Fi network flow 142 transmit the data, two and reliability mode, which uses only the mobile network flow 135 or the Wi-Fi network flow 140 as the primary transmission flow for data transmission.

In order to decide if a switch between the modes is necessary an algorithm is implemented on the processor 115 which makes the decision. The algorithm uses the information of the condition matrix 200 and the decision look-up table 300 to activate the aggregation mode or the reliability mode of the first network entity 100.

FIG. 2 shows an exemplary condition matrix 200 of the invention. The columns 205 of the condition matrix represent different properties of the mobile network flow 135 or the Wi-Fi network flow 140 that can be measured by the measuring units 125, 155 or can be assessed otherwise. The column "MC" 210 indicates the multi-connectivity status of the first network entity 100, the column "Mobile" 215 indicates the status of the mobile communication interface 145, column "Wi-Fi" 220 indicates the status of the Wi-Fi communication interface 150, and the column "@Home" 225 indicates if the first network entity 100 is connected to a special environment, in particular a home environment of the user.

Each line of the condition matrix 200 represents a different combination of those properties mentioned above. For example, from line 1 to line 6 the multi-connectivity of the first network entity 100 is deactivated, from line 8 to line 13 the multi-connectivity of the first network entity 100 is activated, from line 15 to line 24 the multi-connectivity of the first network entity 100 is activated and an additional detecting feature of the internal measuring unit 125 is turned on. "On+@H" means that the internal measuring unit is configured to detect if the first network entity is connected to a special environment @Home.

The empty lines of the condition matrix 200 simply serve the purpose to enhance the clarity of the graphical the presentation.

The measuring units 125, 155 measure the condition values of the first network entity 100, wherein the algorithm searches for a match of these measured condition values within the condition matrix 200.

FIG. 3 shows the exemplary decision look-up table 300 that serves as the basis for the decision of the algorithm if the aggregation mode or the reliability mode is to be activated.

The columns 305 of the decision look-up table 300 are:

"MPTCP enabled" 310, which indicates if the MPTCP protocol is activated, so that multi-connectivity that uses the mobile network flow 135 or the Wi-Fi network flow 140 is active. Activation ("yes") of the MPTCP protocol is a prerequisite to enable both aggregation mode and the reliability mode.

"MPTCP backup mode" 315 indicates if the reliability mode is activated ("yes"). In this case, multi-connectivity is only used as a backup option in case of a failure of the network flow which is selected as the primary network flow. In the case of the mobile network flow 135 and the Wi-Fi network flow 140, the Wi-Fi network flow 140 will usually be chosen to be the primary network flow.

The number of lines decision look-up table 300 is identical to the number of lines of the condition matrix 200.

Some exemplary cases shall be discussed in the following:

i)
Assume the measured condition values are: MC 210: Off; Mobile 215: 4G; Wi-Fi 220: On; @Home 225: —;
For this set of measured condition values, the algorithm finds a match in line 1 of the condition matrix 200. Since MC 210 is "Off" and Wi-Fi 220 is "On" it follows that MPTCP 310 cannot be activated. Hence, the corresponding line 1 of the decision look-up table 300 instructs the algorithm to deactivate "MPTCP enabled" 310 and "MPTCP backup mode" 315, respectively.

ii)
Assume the measured condition values are: MC 210: On; Mobile 215: 4G; Wi-Fi 220: On; @Home 225: —
For these measured condition values, the algorithm finds a match in line 8 of the condition matrix 200. Since MC 210 is "On" and Wi-Fi 220 is "On" it follows that multi-connectivity is possible. The corresponding line 8 of the decision look-up table 300 instructs the algorithm to activate the aggregation mode by setting "MPTCP enabled" 310 to "Yes" and "MPTCP backup mode" 315 to "No". The rationale is that the network flows "4G" and "Wi-Fi" show a heterogeneity level that is well with the heterogeneity threshold so that so that no performance losses are to be expected.

iii) Assume the measured condition values are: MC 210: On; Mobile 215: 3G/2G; Wi-Fi 220:
On; @Home 225: —;
For these measured condition values, the algorithm finds a match in line 9 of the condition matrix 200. Since MC 210 is "On" and Wi-Fi 220 is "On" it follows that it follows that multi-connectivity is possible. The corresponding line 9 of the decision look-up table 300 instructs the algorithm to use activate the reliability mode by setting "MPTCP enabled" 310 to "Yes" and "MPTCP backup mode" 315 to "Yes". The rationale is that the network flows "2G/3G" and "Wi-Fi" show a heterogeneity level that exceeds the heterogeneity threshold so that so that a performance losses are to be expected. Whenever the access technology for the mobile access changes to 2G or 3G, the reliability mode is activated. In any other case, the aggregation mode is activated.

The switch for other multipath network protocols will behave similarly, but the concrete implementation might differ depending on the protocol interfaces provided. If the multipath network protocol does not provide any interface for switching, an access interface deactivation might be considered.

FIG. 4 shows an extended condition matrix 200' that can be incorporated into the condition matrix 200 but it is also possible that the extended parameters are stored in an individual matrix. In that sense, a matrix is not to be understood an a mathematical sense but as a way to represent different kinds of data in tables that might have a different number of lines and columns.

The extended condition matrix 200' has four lines, wherein the first column shows an access type 230, the second column shows a costs 235 value for this access type of the second column, and the fourth column shows a reliability 240 value for the access type of the second column. The lower the reliability 240 value, the likelier it is that the connection will fail within a certain time period. For example, a reliability 240 value of 0.99 indicates that the communication will be successful in 99 of 100 days. The extended condition matrix 200' is only an exemplary listing of the access types and it is without saying that the condition matrix 200' can be extended to list all the access types like 5G, 4G, 3G, Wi-Fi etc. with the associated costs and reliability values.

The algorithm that is running on the processor 115 of the first network entity 100 uses the extended condition matrix 200' in order to decide between the activation of the aggregation mode, the reliability mode or a single-connectivity mode.

The costs 235 values and the reliability 240 values are predefined in the extended condition matrix 200'. Let us assume that the measuring unit 125 measures as the measuring condition values of the first network entity 100 the reliability values of a 2G network flow 135 and a Wi-Fi network flow 140. The reliability value 240 of each of the network flows 135, 140 can be measured by a dedicated performance tests or it can simply be assumed that the 2G network flow 135 and the Wi-Fi network flow 140 have certain reliability values.

Some exemplary cases shall be discussed in the following:
The algorithm is programmed to assume that a reliability 240 value over 0.99 guarantees a reliable network flow.
1)
Assume that the measured reliability 240 value of the 2G network flow 135 is 0.6 and that the measured reliability 240 value of the Wi-Fi network flow 140 is 0.78.
For this set of parameters, the algorithm or a dedicated decision table 300 decides to activate the reliability mode or the aggregation mode because the failure of one of the network flows 135, 140 is very likely, which results in a bad user experience. Therefore, multi-connectivity is important to guarantee a good user experience.
2)
Assume that the measured reliability 240 value of the 2G network flow 135 is 0.6 and that the measured reliability 240 value of the Wi-Fi network flow 140 is 0.994.
For this set of parameters, the algorithm or the dedicated decision table 300 decides to activate the single-connectivity mode and only to use the Wi-Fi network flow 140 because the reliability 240 value of the Wi-Fi network flow 140 is high enough to guarantee a good user experience.
3)
Assume that the measured reliability 240 value of the 2G network flow 135 is 0.996 and that the measured reliability 240 value of the Wi-Fi network flow 140 is 0.991.
For this set of parameters, the algorithm or the dedicated decision table 300 decides to activate the single-connectivity mode because the reliability 240 values of both the 2G network flow 135 and the Wi-Fi network flow 140 are high enough to guarantee a good user experience.

In order to deactivate the multi-connectivity functionality of the first network entity, the algorithm has to decide, which of the two network flows 135, 140 needs to be switched off by deactivating the mobile communication interface 145 or the Wi-Fi communication interface 150. In order to reduce the overall costs for the data transfer, the algorithm considers the appropriate cost 235 values. For this case, the costs 235 of the 2G network flow 135 are "high" while the costs 235 of the Wi-Fi network flow 140 are "low". Hence, the decision is to deactivate the mobile communication interface 145 and to run the single-connectivity mode with the Wi-Fi network flow 140.

An additional prerequisite in making the choice for single-connectivity mode is of course that the network flow that will be chosen for the single-connectivity mode is able to deliver the requested traffic flow by the first network entity 100.

It goes without saying that the values, which are entered in the access type 230, in the cost 235 and in the reliability column, can be designed by a network provider according to his virtual ideas and wishes.

FIG. 5 shows an exemplary decision look-up table 300' that serves as the basis for the decision of the algorithm if one of the multi-connectivity modes or the single-connectivity mode is to be activated.

The columns 305 of the decision look-up table 300' are:
"MPTCP enabled" 310, which indicates if the MPTCP protocol is activated, so that multi-connectivity that uses the mobile network flow 135 or the Wi-Fi network flow 140 is active. Activation ("yes") of the MPTCP protocol is a prerequisite to enable both aggregation mode and the reliability mode.
"single-connectivity mode" 320 indicates if only the single-connectivity mode is activated ("yes") that goes along with deactivating the multi-connectivity functionality.

For example, in line 9 the multi-connectivity functionality is deactivated and single connectivity mode is being activated. The rationale of this decision can be that the network entity is connected to a Wi-Fi in a "at home environment" that is sufficiently reliable in order to deactivate the multi-connectivity mode.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enabling communication between a first network entity and a second network entity via at least two different network flows, wherein the first network entity has a multi-connectivity functionality, and wherein the at least two different network flows use two different communication interfaces, the method comprising the following steps executed by the first network entity:
providing at least a first network flow and a second network flow of the first network entity;
measuring condition values of each of the at least two different network flows by a measuring unit of the first entity or by a measuring unit connected to the first network entity;
comparing the measured condition values of the at least two different network flows to entries of a condition matrix, the condition matrix being stored in a memory unit of the first network entity;
selecting a mode based on the comparison of the measured condition values of the at least two different network flows to the entries of the condition matrix, wherein the selected mode is one of an aggregation mode, a reliability mode, or a single-connectivity mode; and
based on selecting the reliability mode, activating the reliability mode of the first network entity and selecting, based on cost information, the first network flow as a primary transmission flow such that, in the reliability mode, data is transmitted only via the first network flow while the second network flow is kept activated in the background for use as backup in the event of failure of the first network flow, wherein the first network flow is selected as the primary transmission flow based on the first network flow having a lowest cost out of network flow(s) of the at least two different network flows which fulfill a quality-of-service (QOS) requirement for the communication between the first and second network entities, and wherein the second network flow is kept available as backup based on the second network flow having a higher cost than the first network flow;
wherein the condition matrix comprises a plurality of different combinations of indications, wherein each respective combination of indications includes a first indication corresponding to multi-connectivity status of the first network entity, a second indication corresponding to status of a mobile communication interface, a third indication corresponding to status of a Wi-Fi communication interface, and a fourth indication corresponding to status of a connection to a special environment.

2. The method of claim 1, further comprising:
switching to a different mode based on a new set of measured condition values.

3. The method of claim 2, wherein the condition values are measured at regular time intervals and/or at trigger events.

4. The method of claim 1, wherein selecting the mode is based on a decision look-up table which takes the condition matrix into account.

5. The method of claim 1, wherein the condition matrix comprises entries of an access technology of the first network entity and/or of cost information about the at least two different network flows.

6. The method of claim 5, wherein the condition matrix comprises entries of an access state of the access technology.

7. The method of claim 1, wherein the condition matrix comprises entries of a special communication environment of the first network entity, wherein the special communication environment comprises:
basic service sets (BSSs);
service set ID (SSID);
extended service sets (ESSs);
location environment;
@Home environment; and
authentication information.

8. The method of claim 1, wherein the selection of the primary transmission flow is based on the comparison of the measured condition values of the at least two different network flows to the entries of the condition matrix.

9. The method of claim 1, wherein selecting the mode is based on a cost policy that takes different costs of respective network flows into account.

10. The method of claim 1, wherein the condition matrix comprises a plurality of columns, including a first column corresponding to the first indications, a second column corresponding to the second indications, a third column corresponding to the third indications, and a fourth column corresponding to the fourth indications;
wherein the condition matrix further comprises a plurality of lines, each line respectively corresponding to a different combination of indications.

11. The method of claim 1, wherein the first indications indicate whether multi-connectivity is off or on and whether an additional detecting feature of an internal measuring unit is turned on;
wherein the second indications indicate whether the mobile communication interface is off, whether the mobile communication interface has a 2G/3G connection, and whether the mobile communication interface has a 4G connection;
wherein the third indications indicate whether the Wi-Fi communication interface is on or off; and
wherein the fourth indications indicate whether or not the first network entity is connected to the special environment.

12. The method of claim 10, wherein selecting the mode is based on a decision look-up table having the same number of lines as the condition matrix, wherein each respective line of the decision look-up table corresponds to a respective line of the condition matrix, the respective line of the condition matrix corresponding to a respective combination of indications for the first, second, third and fourth columns of the condition matrix;
wherein the decision look-up table comprises a first column corresponding to a Multipath Transmission Control Protocol (MPTCP) and a second column corresponding to an MPTCP backup mode;
wherein entries in the first column of the decision look-up table indicate whether to activate or deactivate the MPTCP; and wherein entries in the second column of the decision look-up table indicate whether to activate or deactivate the MPTCP backup mode.

13. The method of claim 12, wherein the first column of the decision look-up table indicating to deactivate the MPTCP and the second column of the decision look-up table indicating to deactivate the MPTCP backup mode corresponds to selection of the single-connectivity mode;
wherein the first column of the decision look-up table indicating to activate the MPTCP and the second column of the decision look-up table indicating to deactivate the MPTCP backup mode corresponds to selection of the aggregation mode; and
wherein the first column of the decision look-up table indicating to activate the MPTCP and the second column of the decision look-up table indicating to activate the MPTCP backup mode corresponds to selection of the reliability mode.

14. A first network entity for enabling communication between the first network entity and a second network entity via at least two different network flows, the first network entity comprising:
at least two different communication interfaces, wherein each of the at least two different communication interfaces is assigned to a respective network flow;
a memory configured to store a condition matrix and measurement condition values, wherein the condition matrix includes possible communication environments of the network entities and the measurement condition values include actual measured condition values of communication environments of the network entities;
a processor configured to:
compare the measurement condition values to the entries of the condition matrix;
select a mode based on the comparison of the measurement condition values to the entries of the condition matrix, wherein the selected mode is one of an aggregation mode, a reliability mode, or a single-connectivity mode;
activate the aggregation mode of the first network entity, wherein data is transmitted via at least two different network flows simultaneously in the aggregation mode;
activate the reliability mode of the first network entity and select, based on cost information, the first network flow as a primary transmission flow such that, in the reliability mode, only a first network flow is used to transmit data between the network entities while a second network flow is kept activated in the background for use as backup in the event of failure of the first network flow, wherein the first network flow is selected as the primary transmission flow based on the first network flow having a lowest cost out of network flow(s) of the at least two different network flows which fulfill a quality-of-service (QOS) requirement for the communication between the first and second network entities, and wherein the second network flow is kept available as backup based on the second network flow having a higher cost than the first network flow; and
activate the single-connectivity mode, wherein the multi-connectivity functionality is switched off by deactivating at least one of the at least two different communication interfaces in the single-connectivity mode;
wherein the condition matrix comprises a plurality of different combinations of indications, wherein each respective combination of indications includes a first indication corresponding to multi-connectivity status of the first network entity, a second indication corresponding to status of a mobile communication interface, a third indication corresponding to status of a Wi-Fi communication interface, and a fourth indication corresponding to status of a connection to a special environment.

15. The network entity of claim 14, wherein the processor is further configured to obtain the measurement conditions values.

16. The network entity of claim 14, wherein the at least two different communication interfaces are configured to receive the measurement condition values.

17. A non-transitory computer-readable medium having processor-executable instructions stored thereon, wherein the processor-executable, when executed, facilitates performance of a method for enabling a communication between a first network entity and a second network entity via at least two different network flows, wherein the first network entity has a multi-connectivity functionality, and wherein the at least two different network flows use two different communication interfaces, the method comprising the following steps executed by the first network entity:
providing at least a first network flow and a second network flow of the first network entity;
measuring condition values of each of the at least two different network flows by a measuring unit of the first entity or by a measuring unit connected to the first network entity;
comparing the measured condition values of the at least two different network flows to entries of a condition matrix, the condition matrix being stored in a memory unit of the first network entity;
selecting a mode based on the comparison of the measured condition values of the at least two different network flows to the entries of the condition matrix, wherein the selected mode is one of an aggregation mode, a reliability mode, or a single-connectivity mode; and
based on selecting the reliability mode, activating the reliability mode of the first network entity and selecting, based on cost information, the first network flow as a primary transmission flow such that, in the reliability mode, data is transmitted only via the first network flow while the second network flow is kept activated in the background for use as backup in the event of failure of the first network flow, wherein the first network flow is selected as the primary transmission flow based on the first network flow having a lowest cost out of network flow(s) of the at least two different network flows which fulfill a quality-of-service (QOS) requirement for the communication between the first and second network entities, and wherein the second network flow is kept available as backup based on the second network flow having a higher cost than the first network flow;
wherein the condition matrix comprises a plurality of different combinations of indications, wherein each respective combination of indications includes a first indication corresponding to multi-connectivity status of the first network entity, a second indication corresponding to status of a mobile communication interface, a third indication corresponding to status of a Wi-Fi communication interface, and a fourth indication corresponding to status of a connection to a special environment.

* * * * *